UNITED STATES PATENT OFFICE.

CONRAD WIEGAND, OF VIRGINIA CITY, NEVADA.

IMPROVEMENT IN THE PROCESSES OF SEPARATING SILVER FROM OTHER METALS.

Specification forming part of Letters Patent No. 145,265, dated December 2, 1873; reissue No. 5,934, dated June 23, 1874; application filed June 3, 1874.

*To all whom it may concern:*

Be it known that I, CONRAD WIEGAND, of Virginia City, Storey county, State of Nevada, have invented an improved and economical process for the more or less complete separation of silver from other metals, lead excepted; and the following description is sufficient to enable others skilled in the art to understand the same.

My invention embraces the following steps, which, in combination, constitute the process: First, a warm or hot mercurial leaching of base amalgams containing silver, substantially as hereinafter described, the intent of which is to dissolve the silver in mercury, that with the mercury it may filter out into a cooling-receptacle. Second, cooling the filtrate in order to granulate or precipitate the dissolved silver within the filtered-out mercury. Third, collecting the granulated or precipitated silver amalgam from its depositions in cooling-channels, or from obstructions therein, or from vessels containing the filtrate, either by the use of a scoop, with or without perforations in it, or preferably by straining the cooled filtrate through straining-cloth into a quicksilver-reservoir, for thereby not only is the silver amalgam collected, but at the same time the quicksilver is most perfectly fitted for renewed leaching use. Fourth, returning the cold strained mercury, as it strains out, to the original heating-vessel, substantially as hereinafter described. If not carried so far as largely to deplete the amalgam of silver also, lead amalgam, when contained in very rich silver amalgam, may be leached out hot by the use of quicksilver, and subsequently recovered (though imperfectly and still mixed with silver) by straining the filtrate cold. But as the leaching of a base metal (lead) from silver is the direct chemical opposite of the process herein described for leaching silver from base metals, lead excepted, and as I have devised what I deem a better process for the mercurial separation of lead from silver, I hereby disclaim the application of the process herein described to the refining of lead-base silver.

To apply my process to use, if the mixed metals from which the silver is to be separated are not already in that form, they are to be amalgamated to a soft paste, and, after dilution with mercury, they should be screened through fine iron or steel screens, so as to remove iron, stone, or other matters not readily soluble in mercury. Crystallized or caked lumps of amalgam, which will not at first pass the screens, may be made to do so by bruising or grinding, for which purpose a mortar and pestle will answer. The dissolved and screened amalgam is next to be put into an upright vessel, whose sides are impervious to quicksilver, and the bottom of which consists of (or is closed with) a properly supported strainer of cloth or other porous material. This vessel is to shed its strainings into a funnel, designed safely to conduct the filtrate through a cooling tube, trough, or vat into a second straining-vessel. Heat is to be applied to the vessel in which the mixed amalgams are first put, so that the first filtration is warm or hot, while the filtration from the second straining-vessel is cold.

By means of a properly-adapted pump or elevator, or by other means, the quicksilver which strains through the cold strainer is to be returned to the top of the heating-vessel. Each part of the process is so conducted that the vessels, tubes, &c., needful for carrying out the several steps deliver themselves successively to the next in order till the first is again reached, so that the operation of all the parts of the process together constitutes the whole an automatic circulation of mercury through base amalgams, for the purpose of leaching and collecting silver therefrom.

To avoid loss of fine particles of quicksilver and amalgam, (which will occur if cooled by direct contact with water, which is itself running to waste,) the filtrate from the heating-vessel should be conducted through channels (either closed tubes or open troughs) on the outside of which cooling water may circulate out of direct contact with the filtrate passing within them, or the filtrate may be discharged directly into a vat of cooling water; but in this case the water should not be allowed to run to waste.

To avoid loss of quicksilver by volatilization, as well as injury to the health of operatives, the heating-vessel should be provided with a lid, into which a condensing-pipe should be inserted, similar to that of an ordinary retort. A revolving shaft bearing arms may also be attached to the lid, passing through it to near the bottom of the heating-vessel. The object of this shaft is to provide the means of agitation when found needful to prevent choking the strainer, or, with the same object in view, a small jet of steam or air may be introduced near the bottom of the heating-vessel. Heating can generally be best effected by means of a jacket, though other means may be used.

The mercury which strains from the heating-vessel will carry through with it gold and base metals as well as silver, but the proportion of silver is very much greater than of other metals, lead excepted. To recover this silver almost completely, it is only necessary that the filtrate be cooled and strained again. The silver amalgam thus strained out is ready for retorting, and the strained quicksilver for renewed leaching use. Silver may be separated by this process quite free from gold by adding to the once-strained or refined silver amalgam a sufficient quantity of copper amalgam containing no gold. On repeating the alternately warm and cold filtrations the newly-refined silver will be found to contain but a trace of gold. The amalgam which remains in the heating-vessel will retain nearly all the gold with the base metals, lead excepted. They are not lost or wasted. The base metals can be manufactured into merchantable salts, and the gold can be collected in a refined state. But as the separation of gold from base metals (other than lead) is the subject of a supplementary process for gold refining, its description here would be out of place.

Having thus described my invention, what I claim, and desire to secure by Letters Patent, is—

1. The process, substantially as herein described, for the more or less complete refining of silver, by leaching its amalgam out of the amalgams of other metals, (lead excepted,) using warm or hot mercury as a filtering-solvent, and subsequently collecting the silver amalgam from the cooled filtrate, as hereinbefore indicated.

2. The process of feeding the leaching quicksilver in at the top of a heating-vessel whose sides are impervious to quicksilver, which vessel is charged with amalgam containing silver, and straining only at the bottom of the vessel, whereby the leaching quicksilver is compelled to pass throughout the contained amalgam and thoroughly cleanse it of silver.

3. The process of maintaining a leaching circulation of the same quicksilver through heated amalgam, whereby a comparatively small amount of mercury, without itself being consumed thereby, may separate, and by successive increments may collect a large amount of silver from other metals, substantially as hereinbefore described.

4. The process of heating, straining, and cooling the amalgams, and of returning the quicksilver to the heater, substantially as hereinbefore described, without allowing either the amalgam or quicksilver to come in direct contact with water running to waste.

5. The process of cooling the filtrate hereinbefore designated by direct contact with water which is itself kept cool without being allowed to run to waste.

In witness whereof I have hereunto set my hand and seal.

CONRAD WIEGAND. [SEAL.]

Witnesses:
F. YAPLE,
M. A. BEARDSLEE.